US010459914B2

(12) United States Patent
Frenkel et al.

(10) Patent No.: US 10,459,914 B2
(45) Date of Patent: Oct. 29, 2019

(54) DETECTING KEY TOPICS ON ONLINE SOCIAL NETWORKS

(71) Applicant: Facebook, Inc., Menlo Park, CA (US)

(72) Inventors: Daniel Frenkel, San Francisco, CA (US); Ashim Datta, San Francisco, CA (US); Bryan Kauder, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 544 days.

(21) Appl. No.: 14/858,366

(22) Filed: Sep. 18, 2015

(65) Prior Publication Data

US 2017/0083628 A1    Mar. 23, 2017

(51) Int. Cl.
G06F 16/245    (2019.01)
G06Q 50/00    (2012.01)

(52) U.S. Cl.
CPC .......... *G06F 16/245* (2019.01); *G06Q 50/01* (2013.01)

(58) Field of Classification Search
None
See application file for complete search history.

(56) References Cited

U.S. PATENT DOCUMENTS

| 2012/0005224 | A1* | 1/2012 | Ahrens | ................... | H04W 4/21 |
| | | | | | 707/769 |
| 2013/0246432 | A1 | 9/2013 | Paskin | | |
| 2014/0040281 | A1 | 2/2014 | Spivack et al. | | |
| 2014/0280017 | A1* | 9/2014 | Indarapu | ........... | G06F 17/30864 |
| | | | | | 707/711 |
| 2014/0337328 | A1* | 11/2014 | Sarvabhotla | ...... | G06F 17/30867 |
| | | | | | 707/723 |
| 2014/0358885 | A1 | 12/2014 | Zhou et al. | | |
| 2015/0046436 | A1 | 2/2015 | Li et al. | | |

(Continued)

FOREIGN PATENT DOCUMENTS

| JP | 2007233438 A | 9/2007 |
| JP | 2012212333 A | 11/2012 |

(Continued)

OTHER PUBLICATIONS

International Search Report and Written Opinion for International Application PCT/US2015/051231, dated Jun. 7, 2016.

(Continued)

*Primary Examiner* — Christopher J Raab
(74) *Attorney, Agent, or Firm* — Baker Botts L.L.P.

(57) ABSTRACT

A method includes accessing a first set of content objects of an online social network posted within a predetermined timeframe, and identifying trending topics. Each object may be associated with one or more topics. The method further includes accessing a second set of content objects, and identifying a plurality of co-occurring topics associated with the second set. Each content object of the second set is associated with at least one of the identified trending topics. Then, the method includes accessing a third set of content objects, and analyzing the plurality of trending topics and co-occurring topics to detect key topics. Each content object of the third set of content objects may be associated with at least one of the identified co-occurring topics or trending topics. The key topics may be detected based on determining the co-occurring topics or trending topics that are associated with a threshold number of content objects.

19 Claims, 8 Drawing Sheets

(56) References Cited

U.S. PATENT DOCUMENTS

| | | | | |
|---|---|---|---|---|
| 2015/0074131 A1* | 3/2015 | Fernandez | ........ | G06F 17/30029 |
| | | | | 707/758 |
| 2015/0142888 A1 | 5/2015 | Browning et al. | | |
| 2015/0149539 A1* | 5/2015 | Shukla | .................... | H04L 67/22 |
| | | | | 709/204 |
| 2016/0292157 A1* | 10/2016 | Zhang | ............... | G06F 17/30867 |
| 2016/0292219 A1* | 10/2016 | Prabhakar | ......... | G06F 17/30705 |

FOREIGN PATENT DOCUMENTS

| | | |
|---|---|---|
| JP | 2014075006 A | 4/2014 |
| WO | WO 2007043322 A1 | 4/2007 |

OTHER PUBLICATIONS

JP Office Action received from JPO for Patent Application No. 2018-514316. (with English Translation), dated Jul. 23, 2019.

\* cited by examiner

DETECTING KEY TOPICS ON ONLINE SOCIAL NETWORKS

TECHNICAL FIELD

This disclosure generally relates to social graphs and identifying trends within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may identify key topics (e.g., "hot" topics) that have both high relevance and high volume. As an example and not by way of limitation, the social-networking system may surface topics that look across all trending topics to determine co-occurring topics that are both highly relevant to user interests (e.g., based on topic spikes as shown by large deltas) and are included in a high volume of user discussions (e.g., based on a large overall volume of the topic over relatively long-term period of time). In particular embodiments, the social-networking system may access a first set of content objects of an online social network posted with a predetermined timeframe, and identify one or more trending topics from the plurality of topics. Each content object may be associated with one or more topics of a plurality of topics of the online social network. The identified trending topics may each have an associated trending-topic identifier for uniquely identifying the trending topic. In particular embodiments, the social-networking system may then access a second set of content objects of the online social network, and identify a plurality of co-occurring topics associated with the second set of content objects. The social-networking system may then access a third set of content objects of the online social network, and analyze the plurality of trending topics and co-occurring topics to detect one or more key topics. Each content object of the third set of content objects may be associated with at least one of the identified co-occurring topics or at least one of the identified trending topics. The key topics may be detected based on determining one or more of the co-occurring topics and the trending topics that are associated with a threshold number of content objects from among the third set of content objects. This identified key topics may be useful for providing a historical analysis of the most relevant and popular topics that are being discussed on the online social network for particular groups of users for a particular period of time. Furthermore, this information may be useful for advertisers and/or marketers by providing them with tools to better connect with users on the online social network and convey and/or target their products and advertisements to specific groups of users (e.g., users of a particular demographic).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
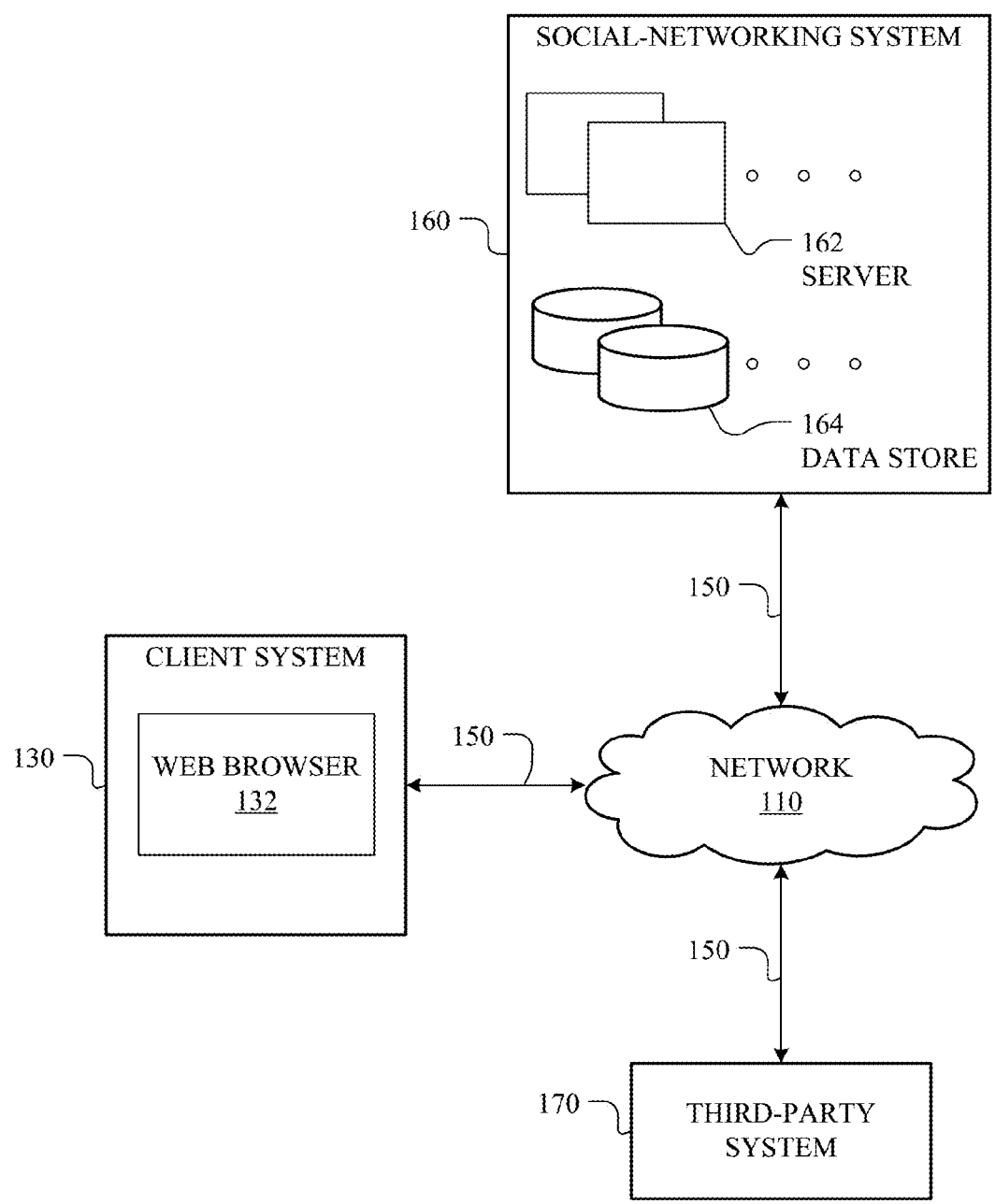
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
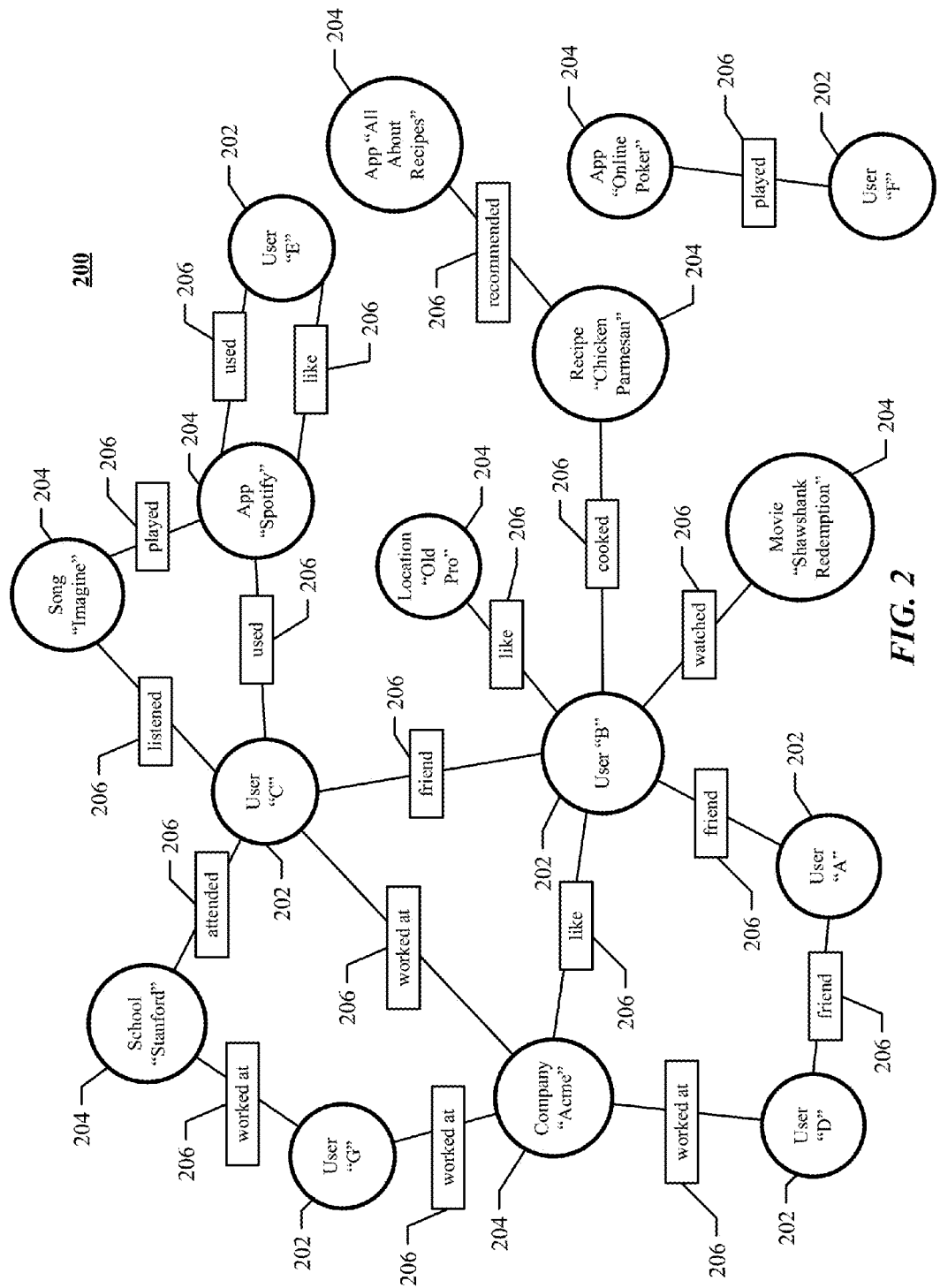
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Identifying and Filtering Key Topics

In particular embodiments, social-networking system 160 may identify one or more key topics (e.g., "hot" topics) that have both high relevance to user interests and high volume of user discussions of an online social network. In addition, in particular embodiments, social-networking system 160 may organize the identified key topics and filter by particular categories associated with social-networking content that the key topics are determined from in order to analyze and present information on what users, and specifically, groups of users of social-networking system 160, are discussing on the online social network. This information may be useful for providing a historical analysis of the most relevant and popular topics that are being discussed on the online social network for particular groups of users for a particular period of time. Furthermore, this information may be useful for advertisers and/or marketers by providing them with tools to better connect with users on the online social network and convey and/or target their products and advertisements to specific groups of users (e.g., users of a particular demographic).

In particular embodiments, social-networking system 160 may utilize a trending algorithm (e.g., an algorithm defined by a given platform based on its needs) to surface content that exhibits a uptick (e.g., increase) in activity that may be related to particular people, places, events, or other topics. The trending topic may be an existing topic, a new topic, two or more co-occurring topics, or a group of topics. A topic may refer to a title, description, name, or any other suitable descriptor or identifier corresponding to a particular event or subject matter. As an example and not by way of limitation, a topic may refer to any suitable event or any suitable subject matter, such as for example, a news event (e.g., the solidarity march in Paris in January 2015), a political event (e.g., the 2016 United States presidential election), a sporting event (e.g., the 2014 World Cup Tournament), an organization (e.g., the Nobel Peace Prize nominating committee), a place (e.g., Yosemite National Park), a person (e.g., Lionel Messi), a product (e.g., iPhone 6s), or a restaurant (e.g., Sancho's Taqueria), or any other type of suitable event or subject matter. As an example and not by way of limitation, the identified content may be determined from user posts associated with (e.g., authored by, liked by, reshared by, commented on by, or viewed by) friends or groups of the user and that are related to a particular topic (e.g., a trending topic) on the online social network. In particular embodiments, these surfaced trending topics may be determined based on a combination of change over time and scale, and thus topics that are typically surfaced are topics that exhibit large, short-term spikes in user interest and may not necessarily be the most relevant or popular topics for an extended period of time. In contrast, the determination of key topics (e.g., "hot" topics) focuses on surfacing topics that look across all trending topics to determine co-occurring topics that are both highly relevant to user interests (e.g., based on topic spikes as shown by large spikes in relevance) and are included in a high volume of user discussions (e.g., based on a large overall volume of the topic over a predetermined period of time). The term "post" as used herein may include a publication created by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network, where the publication does not reference another publication on the online social network. As used herein, the term "reshares" may include publications created by one or more users on the online social network, where the publications each reference another publication on the online social network (for example, the reshare may link to or embed a post). As described herein, a user may be "associated with" a post if the user authors, likes, reshares, comments on, or views a post on the online social network.

Figure 3:
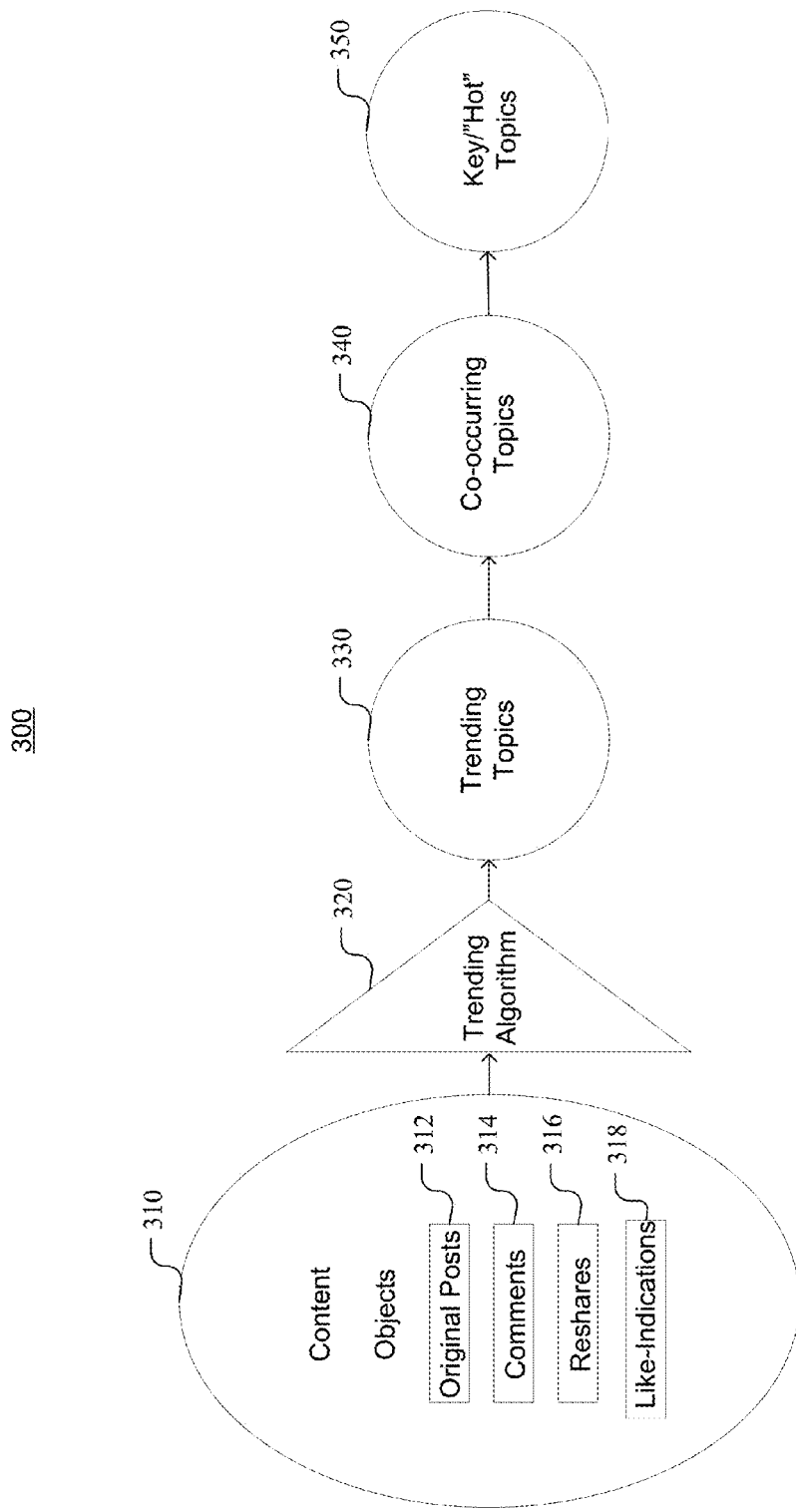
FIG. 3 illustrates an example process 300 for identifying key topics.

As an example and not by way of limitation, if the topic "Phil Collins" goes from zero (0) mentions on February 1 to twenty five (25) mentions on February 2, this spike in user interest may result in the designation of "Phil Collins" as a trending topic (e.g., by the trending algorithm, discussed above, because this is a large relative increase in volume of mentions in one day), but would not necessarily be enough to designate "Phil Collins" as a key topic because of the overall low volume (e.g., the volume is less than a key-topic threshold volume, where 25 mentions may be considered minimal in an online social network where millions of posts are created daily). As another example and not by way of limitation, if after the first day, "Phil Collins" gets approximately one thousand (1000) mentions per day, every day, for the period of February 3 to February 28, then "Phil Collins" may no longer be designated as a trending topic at the end of the month because there is no relative increase in user interest day-over-day, but "Phil Collins" may be designated as a key topic for February at the end of the month because of the overall spike in interest (e.g., a change from zero mentions to thousands of mentions during the month) and the overall volume for the period of time (e.g., tens of thousands of mentions over the period of the month). Although this disclosure describes identifying and filtering key topics in a particular manner, this disclosure contemplates identifying and filtering key topics in any suitable manner FIG. 3 illustrates an example process 300 for identifying and filtering key topics. In particular embodiments, social-networking system 160 may access a first set of content objects of the online social network posted within a predetermined timeframe. As an example and not by way of limitation, content objects 310 of the first set of content objects may include one or more of an original post 312, a comment of a post 314, a reshare of a post 316, and a like-indication associated with a post 318. As another example and not by way of limitation, the predetermined timeframe may be designated by the user or by social-networking system 160, and may include any relevant time frame to the user or social-networking system 160 (e.g., one or more months, one or more years, etc.). In particular embodiments, the first set of content objects may comprise all content uploaded to the online social network within the predetermined timeframe. As an example and not by way of limitation, the first set of content objects may include all original posts, all comments of posts, all reshares of posts, and all like-indications associated with posts of all users associated with the online social network (e.g., the corpus of all content associated with the online social network). Alternatively, the first set of content objects may comprise only certain groups of content uploaded to the online social network within the predetermined timeframe. As an example and not by way of limitation, the first set of content object may include only original posts, comments of posts, reshares of post, and like-indications associated with users between the ages of 18 to 34, between the ages of 35 to 54, and/or above age 55. Although this disclosure describes certain content objects as part of the first set of content objects, this disclosure contemplates any combination of content objects as part of the first set of content objects.

In particular embodiments, each content object 310 may be associated with one or more topics of a plurality of topics of the online social network. As an example and not by way of limitation, content objects 310 identified for a particular one-year period may include one or more of original posts 312, comments of a post 314, reshares of a post 316, and like-indications associated with a post 318 that are associated with a first topic of the movie "The Dark Knight Rises"; one or more original posts 312, comments of a post 314, reshares of a post 316, and like-indications associated with a post 318 that are associated with a second topic of the movie "American Hustle"; one or more original posts 312, comments of a post 314, reshares of a post 316, and like-indications associated with a post 318 that are associated with a third topic of the movie "Lion King"; one or more original posts 312, comments of a post 314, reshares of a post 316, and like-indications associated with a post 318 that are associated with a fourth topic of the movie "Finding Nemo"; and one or more original posts 312, comments of a post 314, reshares of a post 316, and like-indications associated with a post 318 that are associated with a fifth topic of the movie "The Matrix." In this example, the sampling of topics for this particular one-year period includes first topic "The Dark Knight Rises," second topic "American Hustle," third topic "Lion King," fourth topic "Finding Nemo," and fifth topic "The Matrix."

In particular embodiments, social-networking system 160 may identify one or more trending topics from the plurality of topics. As an example and not by way of limitation, as shown in FIG. 3, trending algorithm 320 may analyze the plurality of topics to identify and surface one or more trending topics 330 based on a large spike in user interest associated with the trending topic. In particular embodiments, identifying the one or more trending topics from the plurality of topics may be based on an increase in a number or frequency of posts, like-indications, or reshares on the online social network that are associated with the trending topic within the predetermined timeframe. As an example and not by way of limitation, trending algorithm 320 may determine that, for the particular one-year period, the number of content objects 310 (e.g., including one or more of original posts 312, comments of a post 314, reshares of a post 316, and like-indications associated with a post 318) associated with first topic "The Dark Knight Rises" increases 86%, the number of content objects 310 associated with second topic "American Hustle" increases 120%, the number of content objects 310 associated with third topic "Lion King" increases 6%, the number of content objects 310 associated with fourth topic "Finding Nemo" increases 5%, and the number of content objects 310 associated with fifth topic "The Matrix" increases 15%. Then, trending algorithm 320 may determine that based on either a predetermined threshold increase percentage, or based on a predetermined number of topics that have the highest-increase percentage above a baseline threshold of activity, the trending topics 330 for the particular one-year period includes first topic "The Dark Knight Rises" and second topic "American Hustle." In particular embodiments, the identified trending topics may each have an associated trending-topic identifier. An example and not by way of limitation, as shown in TABLE 1, first trending topic "The Dark Knight Rises" may have a trending-topic identifier "topic ID T01" and second trending topic "American Hustle" may have a trending-topic identifier "topic ID T02." Although this disclosure describes identifying trending topics in a particular manner, this disclosure contemplates identifying trending topics in any suitable manner.

TABLE 1

| Topic ID | Trending Topic |
| --- | --- |
| T01 | "The Dark Knight Rises" |
| T02 | "American Hustle" |

In particular embodiments, social-networking system 160 may access a second set of content objects of the online social network, wherein each content object of the second set of content objects is associated with at least one of the identified trending topics. As an example and not by way of limitation, the second set of content objects may include only content objects that match the identified trending topics. In particular embodiments, social-networking system 160 may poll the trending topics (e.g., based on their trending-topic identifiers) for any content objects that are related to those trending topics. As an example and not by way of limitation, social-networking system 160 may collect all content objects 310 (e.g., including one or more of original posts 312, comments of a post 314, reshares of a post 316, and like-indications associated with a post 318) associated with the first topic "The Dark Knight Rises," and also collect all content objects 310 (e.g., including one or more of original posts 312, comments of a post 314, reshares of a post 316, and like-indications associated with a post 318) associated with the second topic "American Hustle." Then, social-networking system 160 may match the trending-topic identifiers of the trending topics with other content identifiers of content objects (e.g., including one or more of original posts 312, comments of a post 314, reshares of a post 316, and like-indications associated with a post 318) that are tagged with those trending-topic identifiers. As an example and not by way of limitation, as shown in TABLE 2, social-networking system 160 may determine that a post discussing the actor Christian Bale's performance in the movie "The Dark Knight Rises" (e.g., tagged with content ID P01), a reshare of this post (e.g., tagged with content ID R01), and a comment on this post discussing Christian Bale's acting skills (e.g., tagged with content ID C01), all match the topic ID T01, and thus are all associated with trending topic "The Dark Knight Rises." In addition, social-networking system 160 may determine that a post discussing Christian Bale as an actor in the movie "American Hustle" (e.g., tagged with content ID P02), a reshare of this post (e.g., tagged with content ID R02), and a comment on this post discussing Jennifer Lawrence as an actress in addition to Christian Bale in "American Hustle" (e.g., tagged with content ID C02), all match topic ID T02, and thus are all associated with trending topic "American Hustle." Based on this example, the second set of content objects includes at least trending topics "The Dark Knight Rises" and "American Hustle." Although this disclosure describes determining a second set of content objects in which each content object is associated with at least one of the identified trending topics in a particular manner, this disclosure contemplates determining a second set of content objects associated with the identified trending topics in any suitable manner.

TABLE 2

| Content ID | Associated Content | Associated Trending Topic | Co-Occurring Topics |
|---|---|---|---|
| P01 | a post discussing Christian Bale's performance in "The Dark Knight Rises" | "The Dark Knight Rises" (topic ID T01) | Christian Bale (topic ID T03) Batman (topic ID T04) Action movie (topic ID T05) |
| R01 | a reshare of the above post | | |
| C01 | a comment on above post discussing Christian Bale's acting skills | | Christian Bale (topic ID T03) |
| P02 | a post discussing Christian Bale as an actor in "American Hustle" | "American Hustle" (topic ID T02) | Christian Bale (topic ID T03) Boston (topic ID T06) |
| R02 | a reshare of the above post | | |
| C02 | a comment on this post discussing Jennifer Lawrence as an actress in addition to Christian Bale in "American Hustle" | | Christian Bale (topic ID T03) Jennifer Lawrence (topic ID T07) |

In particular embodiments, social-networking system 160 may identify a plurality of co-occurring topics 340 associated with the second set of content objects. As an example and not by way of limitation, social-networking system 160 may identify all of the associated topic IDs contained within the above-identified content IDs (i.e., determining co-occurring topics). In particular, as shown in TABLE 2, social-networking system 160 may determine that the post discussing Christian Bale's performance in "The Dark Knight Rises" with content ID P01 and the share of this post with content ID S01 both include associated topics of "Christian Bale" (e.g., tagged with topic ID T03), "batman" (e.g., tagged with topic ID T04), and "action movie" (e.g., tagged with topic ID T05), and the comment on the post with content ID C01 includes the associated topic "Christian Bale" (e.g., tagged with topic ID T03). In addition, social-networking system 160 may determine that the post discussing Christian Bale in "American Hustle" with content ID P02, and a reshare on this post with content ID R02, both include associated topics of "Christian Bale" (e.g., tagged with topic ID T03), and the U.S. city "Boston" (e.g., with topic ID T06), and the comment on the post discussing Jennifer Lawrence and Christian Bale with content ID C02 includes the associated topics "Christian Bale" (e.g., tagged with topic ID T03) and "Jennifer Lawrence" (e.g., tagged with topic ID T07).

In particular embodiments, social-networking system 160 may identify co-occurring topics 340 associated with the second set of content objects based on an increase in a number or frequency of posts, comments, like-indications, or reshares on the online social network that are associated with the co-occurring topic within the predetermined timeframe. As an example and not by way of limitation, over the predetermined timeframe and within content associated with one or more of trending topic "The Dark Knight Rises" (topic ID T01) and "American Hustle" (topic ID T02), the number of content objects 310 (e.g., including one or more of original posts 312, comments of a post 314, reshares of a post 316, and like-indications associated with a post 318) associated with "Christian Bale" (topic ID T03) increased by 95%, the number of content object 310 associated with "Batman" (topic ID T04) increased by 75%, the number of content object 310 associated with "action movie" (topic ID T05) increased by 90%, the number of content object 310 associated with "Boston" (topic ID T06) increased by 75%, and the number of content objects 310 associated with "Jennifer Lawrence" (topic ID T07) increased by 90%. Accordingly, the identified co-occurring topics 340 for the predetermined timeframe associated with the trending topic "The Dark Knight Rises" would include at least Christian Bale, Batman, and action movie. In addition, the identified co-occurring topics 340 for the predetermined timeframe associated with the trending topic "American Hustle" would include at least Christian Bale, Boston, and Jennifer Lawrence. Although this disclosure describes identifying particular co-occurring topics in a particular manner, this disclosure contemplates identifying co-occurring topics in any suitable manner.

In particular embodiments, social-networking system 160 may access a third set of content objects of the online social network, wherein each content object of the third set of content objects is associated with at least one of the identified co-occurring topics or at least one of the identified trending topics. As an example and not by way of limitation, social-networking system 160 may determine all the topics IDs associated with both the identified trending topics and the identified co-occurring topics, and then search through all content of the online social network to identify all content IDs (e.g., IDs of posts, comments, reshares, and/or like-indications) tagged with one of these associated topic IDs. In particular embodiments, the third set of content objects may include content from the second set of content objects (e.g., content associated with each of the trending topics) in addition to all content matching the co-occurring topics on the online social network. As another example and not by way of limitation, for the predetermined timeframe, the third set of content objects would include all content objects 310 (e.g., including one or more of original posts 312, comments of a post 314, reshares of a post 316, and like-indications associated with a post 318) associated with each of trending topics "The Dark Knight Rises" (topic ID T01), "American Hustle" (topic ID T02), "Christian Bale" (topic ID T03), "Batman" (topic ID T04), "action movie" (topic ID T05), "Boston" (topic ID T06), and "Jennifer Lawrence" (topic ID T07). Although this disclosure describes determining a third set of content objects including content objects associated with either identified trending topics or identified co-occurring topics in a particular manner, this disclosure contemplates determining a third set of content objects in any suitable manner.

In particular embodiments, social-networking system 160 may analyze the plurality of trending topics and co-occurring topics to detect one or more key topics 350 (e.g., "hot" topics), wherein the key topics are detected based on determining one or more of the co-occurring topics and the trending topics that are associated with a threshold number of content objects from among the third set of content objects. In particular embodiments, the threshold number of content objects for determining whether a topic is a key topic may be a predetermined number (e.g., 100,000 content objects, 1,000,000 content objects, etc.) and may depend on the timeframe (e.g., 100,000 per year, etc.), and this predetermined number may be selected by social-networking system 160 or inputted by the user. As an example and not by way of limitation, social-networking system 160 may determine that, for the predetermined timeframe and looking at all identified content of the online social network matching either the identified trending topics or identified co-occurring topics, the number of content objects 310 (e.g., including one or more of original posts 312, comments of a post 314, reshares of a post 316, and like-indications associated with a post 318) associated with "The Dark Knight Rises" (topic ID T01) included a total of approximately 5000 content objects, the number of content objects associated with "American Hustle" (topic ID T02) included a total of approximately 4000 content objects, the number of content objects associated with "Christian Bale" (topic ID T03) included a total of approximately 130,000 content objects, the number of content object 310 associated with "Batman" (topic ID T04) included a total of approximately 6000 content objects, the number of content object 310 associated with "action movie" (topic ID T05) included a total of approximately 2000 content objects, the number of content object 310 associated with "Boston" (topic ID T06) included a total of approximately 1500 content objects, and the number of content objects 310 associated with "Jennifer Lawrence" (topic ID T07) included a total of approximately 90,000 content objects. In this example, social-networking system 160 may determine that a key topic 350 (e.g., a "hot" topic as determined based on high relevance as a trending or co-occurring topic and high volume of user discussions on the online social network) includes "Christian Bale." In particular embodiments, the key topic may be one of the co-occurring topics but not a trending topic (e.g., the example discussed above). Alternatively, the key topic may be one of the trending topics but not a co-occurring topic (e.g., in a situation where "The Dark Knight Rises" is determined to be a key topic). In particular embodiments, content objects 310 (e.g., including one or more of original posts 312, comments of a post 314, reshares of a post 316, and like-indications associated with a post 318) associated with the one or more key topics may comprise a fourth set of content objects (discussed in more detail below). As an example and not by way of limitation, the fourth set of content objects may include all content objects 310 associated with key topic "Christian Bale." Although this disclosure describes determining key topics in a particular manner, this disclosure contemplates determining key topics in any suitable manner.

Figure 4:
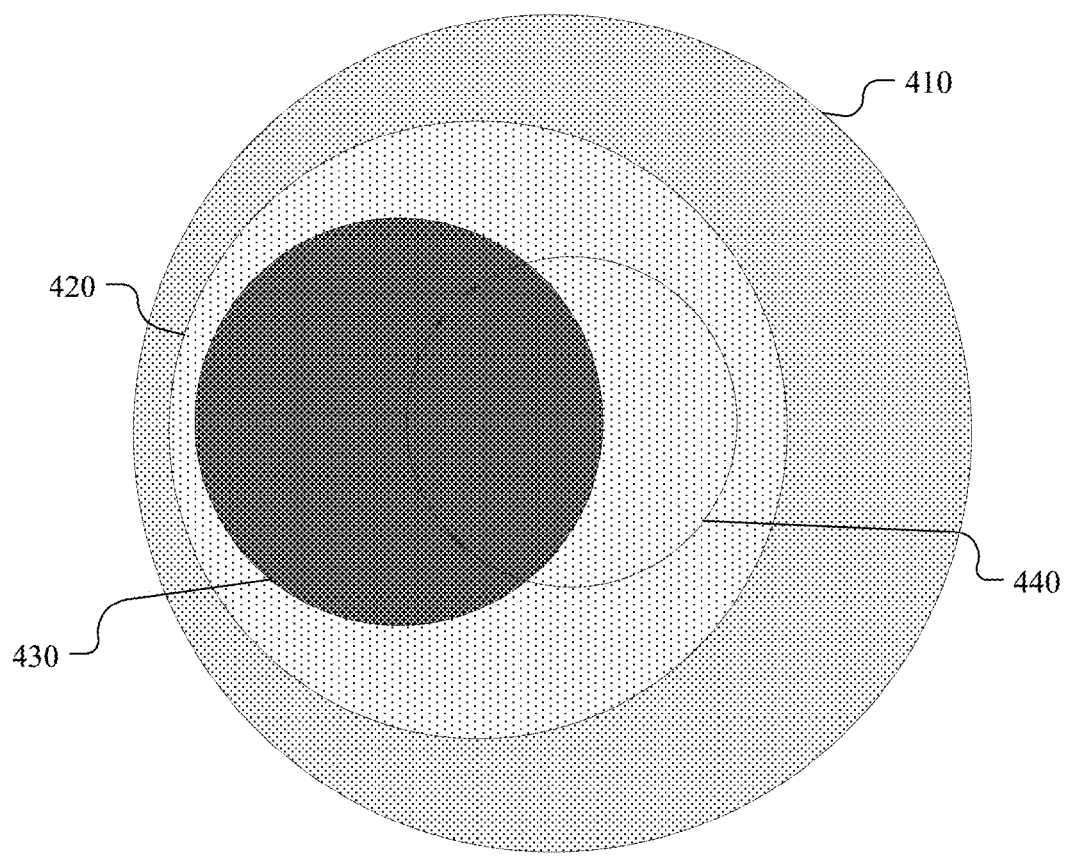
FIG. 4 illustrates a diagrammatic representation of the sets of content objects of the online social network.

FIG. 4 illustrates a diagrammatic representation of the sets of content objects 400 of the online social network. In particular embodiments, first set of content objects 410 may comprise all content objects 310 (e.g., including original posts 312, comments of a post 314, reshares of a post 316, and like-indications associated with a post 318) uploaded to the online social network within a predetermined timeframe, as discussed above. As an example and not by way of limitation, first set of content objects 410 may include the entire corpus of content objects associated with the online social network created within a particular timeframe. In particular embodiments, second set of content objects 420 may comprise only content objects 310 that match the identified trending topics, as discussed above. As an example and not by way of limitation, second set of content objects 420 may include only content objects 310 associated with trending topics "The Dark Knight Rises" and "American Hustle." In particular embodiments, as illustrated in FIG. 4, second set of content objects 420 may be a subset of first set of content objects 410. As an example and not by way of limitation, second set of content objects 420 including content objects 310 associated with the identified trending topics is a subset of all content associated with the online social network.

In particular embodiments, third set of content objects 430 may comprise content from the content objects 310 associated with each of the trending topics (e.g., the content of second set of content objects 420), in addition to all content objects 310 matching the co-occurring topics on the online social network, as discussed above. As an example and not by way of limitation, third set of content objects 430 may include all content objects 310 associated with each of the trending topics "The Dark Knight Rises," "American Hustle," "Christian Bale," "Batman," "action movie," "Boston," and "Jennifer Lawrence." In particular embodiments, as illustrated in FIG. 4, third set of content objects 430 may be a subset of first set of content objects 410. As an example and not by way of limitation, third set of content objects 430 including content objects 310 associated with the identified trending topics and the identified co-occurring topics is a subset of all content associated with the online social network. In particular embodiments, second set of content objects 420 intersects with (e.g., overlaps with) third set of content objects 430 with regard to at least one content object that is associated with at least one of the co-occurring topics and at least one of the trending topics. As an example and not by way of limitation, second set of content objects 420 overlaps with third set of content objects 430 with regard to content objects 310 associated with overlapping topics "The Dark Knight Rises" and "American Hustle." In particular embodiments, second set of content objects 420 is may be a subset of third set of content objects 430. As an example and not by way of limitation, second set of content objects 420 including content objects 310 associated with topics "The Dark Knight Rises" and "American Hustle" is a subset of third set of content objects 430.

In particular embodiments, fourth set of content objects 440 may comprise all content objects 310 associated with the one or more key topics, as discussed above. As an example and not by way of limitation, fourth set of content objects 440 may include all content objects 310 associated with key topic "Christian Bale." In particular embodiments, as illustrated in FIG. 4, fourth set of content objects 440 may intersects with (e.g., overlaps with) with second set of content objects 420 with regard to at least one content object that is associated with at least one of the co-occurring topics and at least one of the key topics. As an example and not by way of limitation, fourth set of content objects 440 overlaps with second set of content objects 420 with regard to at least one content object that is associated with key topic "Christian Bale." In particular embodiments, fourth set of content objects 440 may be a subset of third set of content objects 440. As an example and not by way of limitation, fourth set of content objects 440 including content objects 310 associated with the identified key topics is a subset of third set of content objects 440 including content objects 310 associated with each of the trending topics and co-occurring topics. In particular embodiments, fourth set of content objects 440 may be a sub set of first set of content objects 410. As an example and not by way of limitation, fourth set of content objects 440 including content objects 310 associated with the identified key topics is a subset of all content associated with the online social network. Although this disclosure describes various set of content objects in a particular manner, this disclosure contemplates various set of content objects in any suitable manner.

In particular embodiments, social-networking system 160 may rank the one or more key topics based on a user-specific metric. As an example and not by way of limitation, the one or more key topics may be ranked based on a user-specified metric assessing the total number of content objects associated with the topic across all content on the online social network and ranking the key topics based on the topics with the highest number of content objects. In particular embodiments, social-networking system 160 may rank the one or more key topics based on metrics specific to the online social network. As an example and not by way of limitation, social-networking system 160 may only include one or more key topics that first appeared on the online social network with the last two (2) years. As another example and not by way of limitation, social-networking system 160 may rank the one or more key topics in a list form, a pictorial representation (e.g., by using various sizes of a particular shape to indicate more or less content indicating a higher or lower ranking, as discussed below), any other suitable representation, or any combination thereof.

In particular embodiments, social-networking system 160 may, after detecting the one or more key topics, access the fourth set of content objects of the online social network, the fourth set of content objects comprising one or more content objects of the third set of content objects associated with the key topics, and separate the fourth set of content objects into a plurality of groups. As an example and not by way of limitation, as discussed above, fourth set of content objects 440 may include content objects 310 (e.g., including original posts 312, comments of a post 314, reshares of a post 316, and like-indications associated with a post 318) associated with key topic "Christian Bale." In particular embodiments, each of the groups may be associated with one or more user attributes. In particular embodiments, the one or more user attributes may comprise one or more of an age, a gender, and a sentiment associated with one or more content objects of the fourth set of content objects. As an example and not by way of limitation, the plurality of groups that content objects 310 of fourth set of content objects 440 may be separated into different groups associated with user attributes such as age (e.g., the age associated with the user of original post, comment, reshare, and/or like-indication), gender (e.g., the gender associated with the user of original post, comment, reshare, and/or like-indication), and/or sentiment (e.g., the sentiment associated with the user of original post, comment, reshare, and/or like-indication) for each piece of content. In particular embodiments, social-networking system 160 may determine or infer a sentiment and/or sentiment polarity of users toward topics or content objects of the online social network. As an example and not by way of limitation, the determined and/or inferred sentiment polarity includes not just whether the user's actions demonstrates a positive or negative sentiment toward a topic of content object, but also the degree of negative or positive sentiment toward the topic of content. Sentiment analysis is further discussed in U.S. patent application Ser. No. 14/023,136, filed 10 Sep. 2013, and is incorporated by reference herein.

In particular embodiments, social-networking system 160 may compare the content objects of at least a first group of the plurality of groups with the content objects of at least a second group of the plurality of groups, the first group being different from the second group. In particular embodiments, the first group may be associated with one or more first user attributes and the second group may be associated with one or more second user attributes, and at least one of the one or more first user attributes may be different from at least one of the one or more second user attributes. As an example and not by way of limitation, a first group of content objects may be associated with a first user attribute of female gender, and a second group of content objects may be associated with a second user attribute of male gender. In this example, social-networking system 160 may first determine one or more key topics associated with each of the groups of content objects divided by gender (based on the method described above), and then compare and contrast the one or more key topics associated with each group (i.e., gender). As another example and not by way of limitation, a first group of content objects may be associated with a first user attribute of a user age between 18-34 years, a second group of content objects may be associated with a second user attribute of a user age between 35-54 years, and a third group of content objects may be associated with a third user attribute of a user age above 55 years. In this example, social-networking system 160 may first determine one or more key topics associated with each of the three groups divided by user age (based on the method described above), and then compare and contrast the one or more key topics associated with each group (i.e., user age). As yet another example and not by way of limitation, social-networking system 160 may determine that the users posting the pieces of content associated with key topic "Christian Bale" breaks down into about 60% women and 40% men, and about 60% of users between the ages of 18-34, about 30% between the ages of 35-54, and about 10% of users above age 55.

Alternatively, in particular embodiments, social-networking system 160 may, prior to identifying the plurality of co-occurring topics, separate the second set of content objects into a plurality of groups. Each of the groups may be associated with one or more user attributes, as described above. The identifying of the plurality of co-occurring topics associated with the second set of content objects may comprise identifying one or more co-occurring topics for each of the plurality of groups of the second set of content objects, as described above. The user attributes may comprise one or more of an age, a gender, and a sentiment associated with one or more content objects of the second set of content objects, as described above. Although this disclosure describes ranking and/or filtering key topics in a particular manner, this disclosure contemplates ranking and/or filtering key topics in any suitable manner.

Figure 5A:
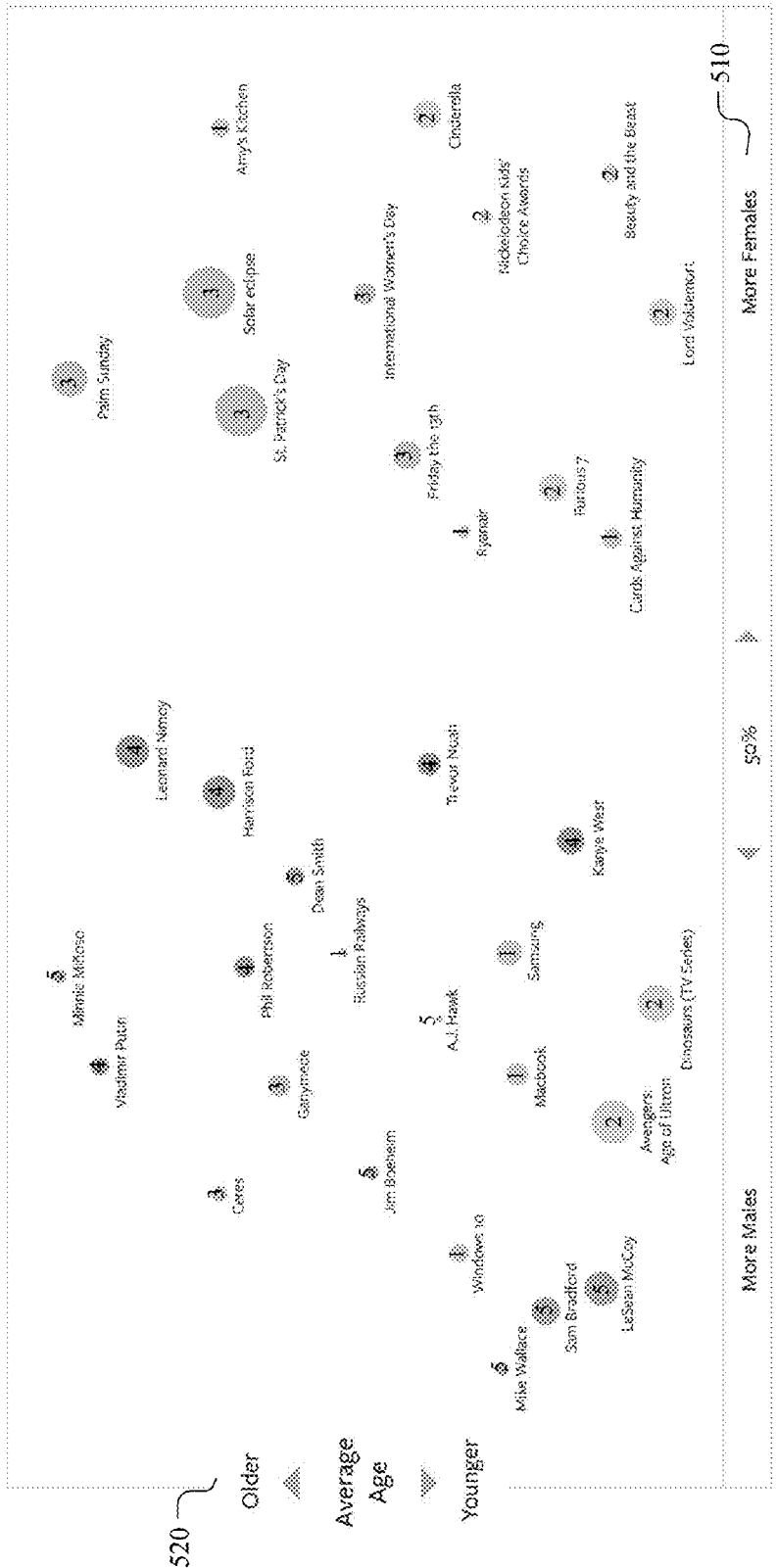
FIG. 5A illustrates a graphical representation of rankings and comparisons of categories of extracted key topics.

FIG. 5A illustrates a graphical representation 500 of rankings and comparisons of categories of extracted key topics for a particular timeframe (e.g., for the month of March 2015). As shown in FIG. 5A, x-axis 510 represents the user attribute of gender (e.g., key topics distributed based on more male-gender interest or more female-gender interest), and y-axis 520 represents the user attribute of age (e.g., key topics distributed based on younger versus older user age). Additional insights may also be taken from FIG. 5A. As an example and not by way of limitation, each key topic is represented by a circular shape, and the size of this circular shape indicates the total volume of content objects associated with this topic (e.g., the larger the shape, the higher the total volume of content objects). In this example, this change in size of the circular shape associated with each key topic may be a visual representation of a ranking system, as discussed above. As another example and not by way of limitation, the key topics are divided into various categories of content (e.g., "brands and products," "entertainment," "holidays and events," "people," and "sports") that are determined based on the content of the content item, and provide an additional dimension of useful information. Although this disclosure describes particular categories, this disclosure contemplates any suitable categories that may be relevant to a social-networking system 160, advertisers, marketers, etc.

As shown in FIG. 5A, various key topics determined for the timeframe of March 2015 are visually distributed along x-axis 510 and y-axis 520. As an example and not by way of limitation, during this time period, there was high relevance of interest among older males and a high volume of discussion among older males for the topics of the President of Russia "Vladimir Putin" and the American baseball player "Minnie Miñoso." As another example and not by way of limitation, during this time period, there was high relevance of interest among older females and a high volume of discussion among older females for the topics of the Christian holiday "Palm Sunday," "solar eclipse," the food company "Amy's Kitchen," and the holiday "St. Patrick's Day." As yet another example and not by way of limitation, during this time period, there was high relevance of interest among younger males and a high volume of discussion among younger males for the topics of the American football player "LeSean McCoy," the TV show "Dinosaurs (TV Series)," and the movie "Avengers: Age of Ultron." As yet another example and not by way of limitation, during this time period, there was high relevance of interest among younger females and a high volume of discussion among younger females for the topics of the fictional book character from the Harry Potter books "Lord Voldemort," the card game "Cards Against Humanity," and the animated movie "Beauty and the Beast."

Figure 5B:
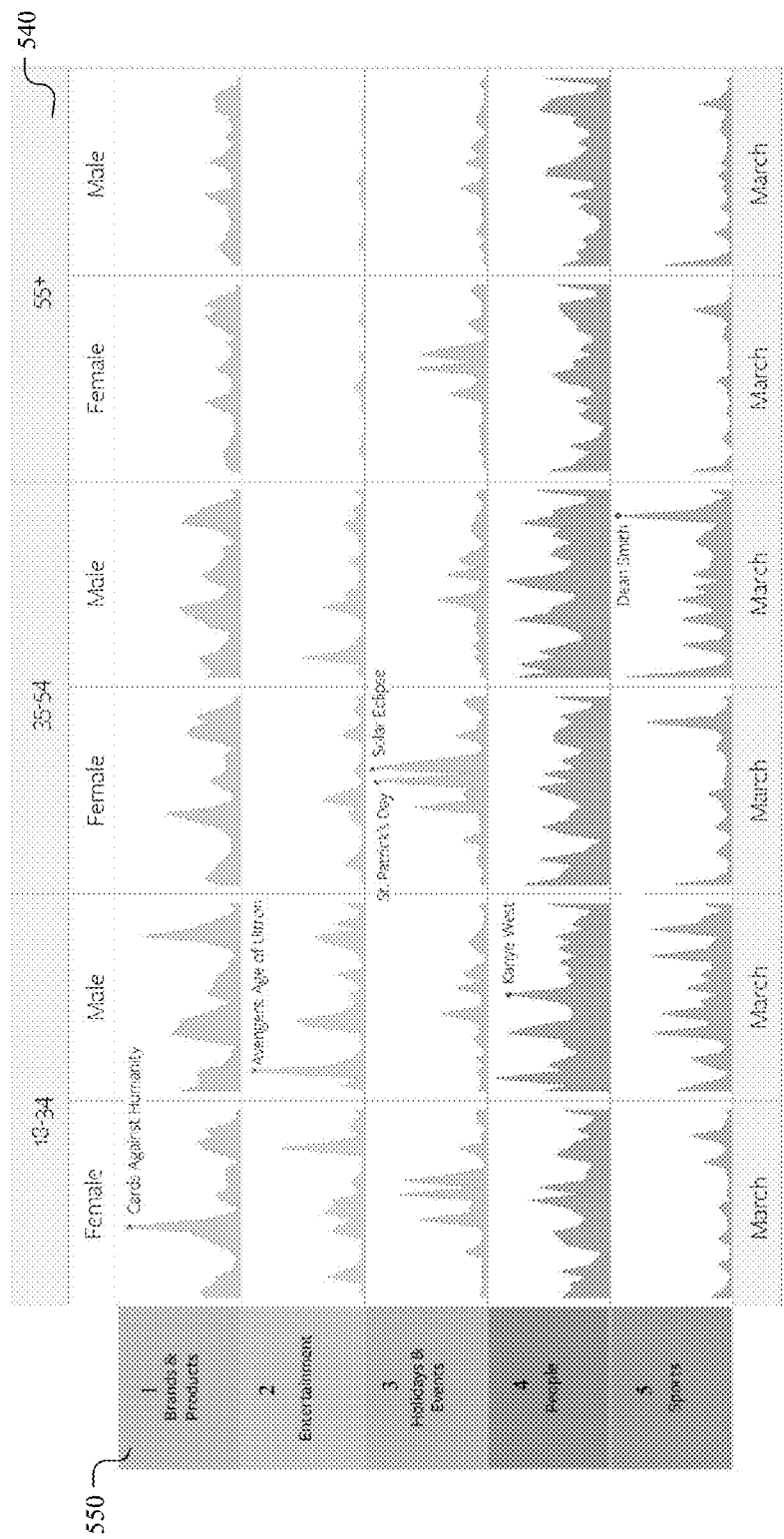
FIG. 5B illustrates a graphical representation of a comparison of topics peaks and key topics for certain groups of content objects.

FIG. 5B illustrates a graphical representation 530 of a comparison of topics peaks and key topics for certain groups of content objects for the particular timeframe. As shown in FIG. 5B, x-axis 540 represent the users attributes of both gender (e.g., key topics distributed based on more male-gender interest or more female-gender interest) and age (e.g., key topics distributed based on a first group of ages 18-34, a second group of ages 35-54, and a third group of ages 55 and over), and y-axis 550 represents the categories content that are determined based on the content of the content item (e.g., "brands and products," "entertainment," "holidays and events," "people," and "sports"). Similar to FIG. 5A, FIG. 5B also shows various key topics determined for the timeframe of March 2015 that are visually distributed along x-axis 540 and y-axis 550. As an example and not by way of limitation, during this time period, "cards against humanity" (e.g., which is part of the category of "brands and products") was determined to have the highest relevance of interest and highest volume of discussion amount females between the ages of 18-34. As another example and not by way of limitation, during this time period, the movie "Avengers: Age of Ultron" (e.g., which is part of the category of "entertainment") and the musician "Kanye West" (e.g., which is part of the category of "people") were determined to have the highest relevance of interest and highest volume of discussion amount males between the ages of 18-34. As yet another example and not by way of limitation, during this time period, "solar eclipse" and the holiday "St. Patrick's Day" (e.g., which is part of the category of "holidays and events") were determined to have the highest relevance of interest and highest volume of discussion amount females between the ages of 35-54. As yet another example and not by way of limitation, during this time period, the American basketball coach "Dean Smith" (e.g., which is part of the category of "sports") was determined to have the highest relevance of interest and highest volume of discussion amount males between the ages of 35-54. Although this disclosure describes displaying key topics in a particular manner, this disclosure contemplates displaying key topics in any suitable manner.

In particular embodiments, key topic information may be valuable to advertisers and marketers because advertisers and/or marketers may be interested in determining the various topics that have the highest relevance to user interests and highest volume of users discussion on the online social network. As an example and not by way of reference, advertisers and/or marketers may be interested in which topics are considered key topics for a particular period of time in order to better understand whether the products and/or services they are pushing are gaining sufficient popularity. For example, if their products and/or services are age-specific and/or gender-specific, advertisers and/or marketers may be interested in knowing whether their products and/or services have exhibited sufficient user interest and volume to be a key topic, and whether the products and/or services are exhibiting high relevance to user interest and high volume of user discussion within the correct groups (e.g., either age or gender, or a combination of both). If these products and/or services are exhibiting high relevance and high volume to be considered a key topic, then the advertisers and/or marketers are able to use that feedback to determine that their current marketing and/or sales approaches are working. However, if these products and/or services are not exhibit either high relevance or high volume, and particular if this is not occurring in the correct age and/or gender group, then the advertisers and/or marketers are able to use this feedback to determine that they may need to revise and/or update their approaches for marketing and/or sales of their products and/or services. Moreover, advertisers and/or marketers may also be able to utilize sentiment analysis associated with their products to gain a better sense of what users on the online social network generally feed toward their products and/or services.

Figure 6:
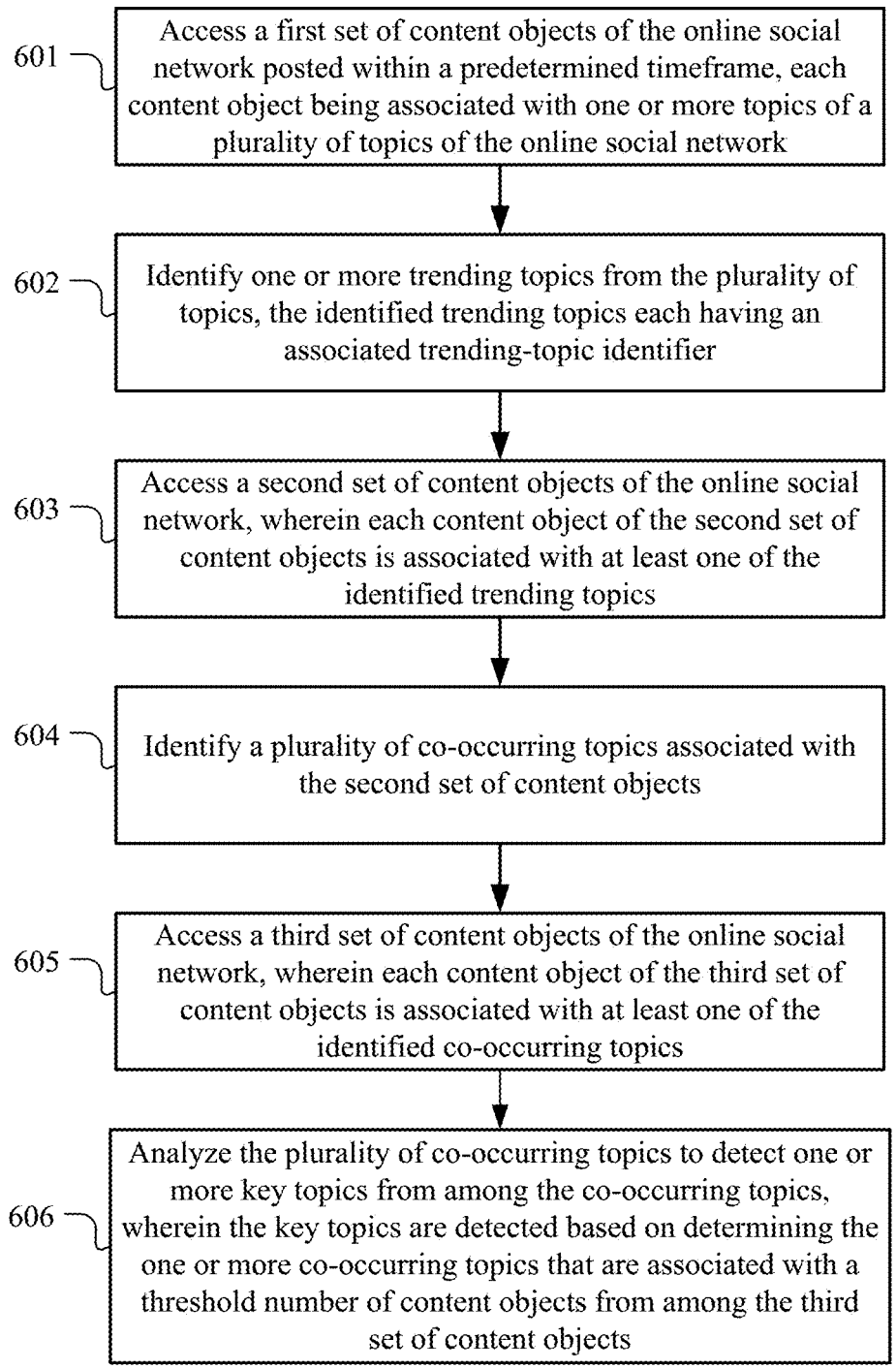
FIG. 6 illustrates an example method 600 of identifying and filtering key topics.

FIG. 6 illustrates an example method 600 for identifying and filtering key (e.g., "hot") topics. The method may begin at step 601, where social-networking system 160 may access a first set of content objects of the online social network posted within a predetermined timeframe. In particular embodiments, each content object may be associated with one or more topics of a plurality of topics of the online social network. At step 602, social-networking system 160 may identify one or more trending topics from the plurality of topics In particular embodiments, the identified trending topics may each have an associated trending-topic identifier. At step 603, social-networking system 160 may access a second set of content objects of the online social network. In particular embodiments, each content object of the second set of content objects may be associated with at least one of the identified trending topics. At step 604, social-networking system 160 may identify a plurality of co-occurring topics associated with the second set of content objects. At step 605, social-networking system 160 may accessing a third set of content objects of the online social network. In particular embodiments, each content object of the third set of content objects may be associated with at least one of the identified co-occurring topics or at least one of the identified trending topics. At step 606, social-networking system 160 may analyze the plurality of trending topics and co-occurring topics to detect one or more key topics. In particular embodiments, the key topics may be detected based on determining one or more of the co-occurring topics and the trending topics that are associated with a threshold number of content objects from among the third set of content objects. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for identifying and filtering key (e.g., "hot") topics including the particular steps of the method of FIG. 6, this disclosure contemplates any suitable method for identifying and filtering key topics including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Systems and Methods

Figure 7:
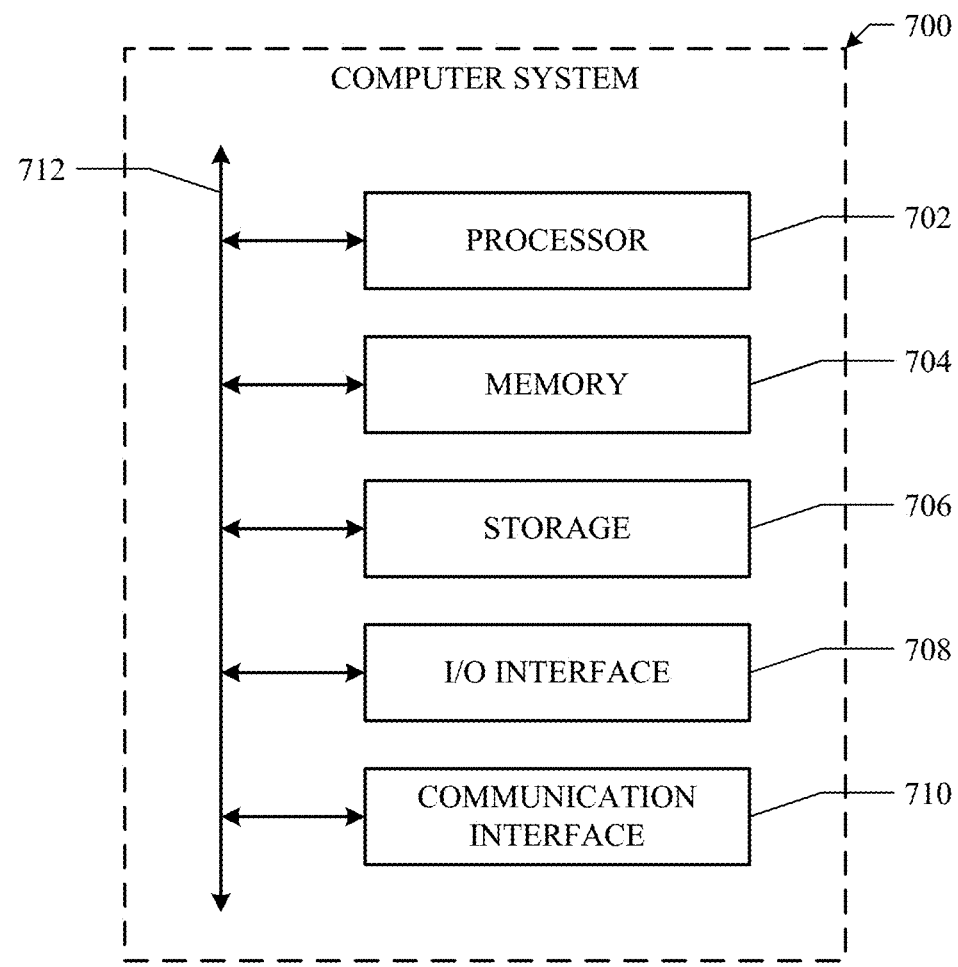
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:

accessing a first set of content objects of the online social network, wherein each content object of the first set of content objects is associated with a time within a predetermined timeframe, and wherein each content object of the first set of content objects is associated with one or more topics of a plurality of topics of the online social network;

identifying, from the plurality of topics, a set of trending topics associated with the first set of content objects, wherein each topic is identified as a trending topic based on an increase in a number or frequency of content objects of the first set of content objects associated with the topic above a first predetermined threshold;

accessing, from the first set of content objects, a second set of content objects of the online social network, wherein each content object of the second set of content objects is associated with at least one of the identified trending topics;

identifying a set of co-occurring topics associated with the second set of content objects, wherein each topic is identified as a co-occurring topic based on an increase in a number or frequency of content objects of the second set of content objects associated with the topic above a second predetermined threshold;

accessing a third set of content objects of the online social network, wherein each content object of the third set of content objects is associated with at least one of the identified co-occurring topics or at least one of the identified trending topics;

identifying, from the set of trending topics or the set of co-occurring topics, a set of key topics associated with the third set of content objects, wherein each topic is identified as a key topic based on an increase in a number or frequency of content objects of the third set of content objects associated with the topic above a third predetermined threshold; and accessing a fourth set of content objects to send to a computing device of a user of the online social network, wherein each content object of the fourth set of content objects is associated with at least one of the identified key topics.

2. The method of claim 1, further comprising, prior to identifying the set of co-occurring topics, separating the second set of content objects into a plurality of groups,
wherein each of the groups is associated with one or more user attributes, and
wherein the identifying of the set of co-occurring topics associated with the second set of content objects comprises identifying one or more co-occurring topics for each of the plurality of groups of the second set of content objects.

3. The method of claim 2, wherein the one or more user attributes comprise one or more of an age, a gender, and a sentiment associated with one or more content objects of the second set of content objects.

4. The method of claim 1, further comprising, after accessing the fourth set of content objects:
accessing a fifth set of content objects of the online social network, the fifth set of content objects comprising one or more content objects of the fourth set of content objects associated with the key topics; and
separating the fifth set of content objects into a plurality of groups,
wherein each of the groups is associated with one or more user attributes.

5. The method of claim 4, wherein the fifth set of content objects intersects with the second set of content objects with regard to at least one content object that is associated with at least one of the co-occurring topics and at least one of the key topics.

6. The method of claim 4, wherein the fifth set of content objects is a subset of the third set of content objects.

7. The method of claim 4, wherein the one or more user attributes comprise one or more of an age, a gender, and a sentiment associated with one or more content objects of the fifth set of content objects.

8. The method of claim 4, further comprising:
comparing the content objects of at least a first group of the plurality of groups with the content objects of at least a second group of the plurality of groups, the first group being different from the second group.

9. The method of claim 8, wherein the first group is associated with one or more first user attributes and the second group is associated with one or more second user attributes, and wherein at least one of the one or more first user attributes is different from at least one of the one or more second user attributes.

10. The method of claim 1, wherein the set of key topics are ranked based on a user-specified metric.

11. The method of claim 1, wherein the first set of content objects comprises all content uploaded to the online social network within the predetermined timeframe.

12. The method of claim 1, wherein the content objects comprise one or more of an original post, a comment of a post, a reshare of a post, and a like-indication associated with a post.

13. The method of claim 1, wherein identifying the set of trending topics from the plurality of topics is based on an increase in a number or frequency of posts, comments, like-indications, or reshares on the online social network that are associated with the trending topic within the predetermined timeframe.

14. The method of claim 1, wherein the fourth set of content objects is a subset of the first set of content objects.

15. The method of claim 1, wherein the second set of content objects intersects with the fourth set of content objects with regard to at least one content object that is associated with at least one of the co-occurring topics and at least one of the trending topics.

16. The method of claim 1, wherein the second set of content objects is a subset of the fourth set of content objects.

17. The method of claim 1, wherein identifying the set of co-occurring topics associated with the second set of content objects is based on an increase in a number or frequency of posts, comments, like-indications, or reshares on the online social network that are associated with the co-occurring topic within the predetermined timeframe.

18. One or more computer-readable non-transitory storage media embodying software that is operable when executed to:
access a first set of content objects of the online social network, wherein each content object of the first set of content objects is associated with a time within a predetermined timeframe, and wherein each content object of the first set of content objects is associated with one or more topics of a plurality of topics of an online social network;
identify, from the plurality of topics, a set of trending topics associated with the first set of content objects, wherein each topic is identified as a trending topic based on an increase in a number or frequency of content objects of the first set of content objects associated with the topic above a first predetermined threshold;
access, from the first set of content objects, a second set of content objects of the online social network, wherein each content object of the second set of content objects is associated with at least one of the identified trending topics;
identify a set of co-occurring topics associated with the second set of content objects, wherein each topic is identified as a co-occurring topic based on an increase in a number or frequency of content objects of the second set of content objects associated with the topic above a second predetermined threshold;
access a third set of content objects of the online social network, wherein each content object of the third set of content objects is associated with at least one of the identified co-occurring topics or at least one of the identified trending topics;
identify, from the set of trending topics or the set of co-occurring topics, a set of key topics associated with the third set of content objects, wherein each topic is identified as a key topic based on an increase in a number or frequency of content objects of the third set of content objects associated with the topic above a third predetermined threshold; and
access a fourth set of content objects to send to a computing device of a user of the online social network, wherein each content object of the fourth set of content objects is associated with at least one of the identified key topics.

19. A system comprising: one or more processors; and a memory coupled to the processors comprising instructions executable by the processors, the processors operable when executing the instructions to:

access a first set of content objects of the online social network, wherein each content object of the first set of content objects is associated with a time within a predetermined timeframe, and wherein each content object of the first set of content objects is associated with one or more topics of a plurality of topics of an online social network;

identify, from the plurality of topics, a set of trending topics associated with the first set of content objects, wherein each topic is identified as a trending topic based on an increase in a number or frequency of content objects of the first set of content objects associated with the topic above a first predetermined threshold;

access, from the first set of content objects, a second set of content objects of the online social network, wherein each content object of the second set of content objects is associated with at least one of the identified trending topics;

identify a set of co-occurring topics associated with the second set of content objects, wherein each topic is identified as a co-occurring topic based on an increase in a number or frequency of content objects of the second set of content objects associated with the topic above a second predetermined threshold;

access a third set of content objects of the online social network, wherein each content object of the third set of content objects is associated with at least one of the identified co-occurring topics or at least one of the identified trending topics;

identify, from the set of trending topics or the set of and co-occurring topics, a set of key topics associated with the third set of content objects, wherein each topic is identified as a key topic based on an increase in a number or frequency of content objects of the third set of content objects associated with the topic above a third predetermined threshold; and access a fourth set of content objects to send to a computing device of a user of the online social network, wherein each content object of the fourth set of content objects is associated with at least one of the identified key topics.

* * * * *